(12) United States Patent
Kiewitt et al.

(10) Patent No.: US 6,674,632 B2
(45) Date of Patent: Jan. 6, 2004

(54) MOBILE TELEPHONE DEVICE WITH PASSIVE INTEGRATED MODULE

(75) Inventors: Rainer Kiewitt, Roetgen (DE); Mareike Katharine Klee, Hueckelhoven (DE); Pieter Willem Jedeloo, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/908,548

(22) Filed: Jul. 19, 2001

(65) Prior Publication Data

US 2002/0015276 A1 Feb. 7, 2002

(30) Foreign Application Priority Data

Jul. 21, 2000 (DE) .......................................... 100 35 584

(51) Int. Cl.[7] .............................................. H01G 4/228
(52) U.S. Cl. ................... 361/306.2; 361/321; 361/328; 361/329; 361/396; 257/676; 257/697
(58) Field of Search ............................ 361/306.2, 734, 361/723, 321, 328, 329, 393, 396, 398; 257/676, 691, 687, 722, 723

(56) References Cited

U.S. PATENT DOCUMENTS

| | | | | |
|---|---|---|---|---|
| 4,130,738 A | * | 12/1978 | Sandstedt | |
| 4,611,882 A | * | 9/1986 | Ushida | ......................... 357/80 |
| 4,630,171 A | * | 12/1986 | Dubuisson et al. | |
| 5,220,489 A | * | 6/1993 | Barreto et al. | |
| 5,408,188 A | * | 4/1995 | Katoh | ......................... 324/757 |
| 5,628,049 A | * | 5/1997 | Suemitsu | |
| 5,781,848 A | * | 7/1998 | Komoda | |
| 5,798,567 A | * | 8/1998 | Kelly et al. | |
| 5,828,957 A | * | 10/1998 | Kroeger et al. | |
| 5,851,868 A | * | 12/1998 | Kim | ........................... 438/238 |
| 5,999,065 A | * | 12/1999 | Furutani et al. | ............ 333/103 |
| 6,038,122 A | | 3/2000 | Bergstedt et al. | ........... 361/306 |
| 6,049,722 A | * | 4/2000 | Umemoto et al. | |
| 6,131,020 A | * | 10/2000 | Oja et al. | ................. 455/226.1 |
| 6,222,260 B1 | * | 4/2001 | Liang et al. | |
| 6,373,127 B1 | * | 4/2002 | Baudouin et al. | |

* cited by examiner

*Primary Examiner*—Dean A. Reichard
*Assistant Examiner*—Nguyen T. Ha
(74) *Attorney, Agent, or Firm*—Steven R. Biren

(57) ABSTRACT

A mobile telephone device fitted with a transmitter and a receiver each having a high-frequency component with an integrated decoupling capacitor. The high-frequency component includes a substrate with the decoupling capacitor on one surface thereof, first and second current supply terminals for the capacitor on the same surface of the substrate as the capacitor, one capacitor electrode connected to a high frequency circuit and a DC voltage source, also on the one surface of the substrate, and the other capacitor electrode connected to ground.

23 Claims, 2 Drawing Sheets

MOBILE TELEPHONE DEVICE WITH PASSIVE INTEGRATED MODULE

BACKGROUND OF THE INVENTION

This invention relates to a mobile telephone device provided with a transmitter and a receiver which may each comprise a high-frequency component.

A mobile telephone device comprises, besides a loudspeaker, a display device, and means for the supply of power, also a transmitter with a high-frequency component and a receiver with a high-frequency component for the purpose of receiving and transmitting data.

The mobile telephone device comprises not only a high-frequency circuit but also a DC source which is to be decoupled from the high-frequency signals.

Capacitors, so-called decoupling capacitors, are used for decoupling. The function of a decoupling capacitor is to attenuate the undesirable high-frequency signals so as to safeguard a constant DC power supply to the components of the high-frequency circuit.

To obtain decoupling over a wide frequency range, decoupling capacitors are required which have a high C/L (capacitance/inductance) ratio, i.e. with high capacitance values and low inductance values. In an ideal case, all undesirable high-frequency signals are smoothed out by such capacitors. Although discrete capacitors with low inductance values can be manufactured nowadays, inductance values of 400 pH for capacitors of the type 0402 and 300 pH for capacitors of the type 0201 are so high that it is only possible to use capacitors with capacitance values of a few pF. Only a narrow frequency range can be decoupled by means of such a decoupling capacitor. For this reason, several discrete capacitors with different capacitance values are provided on the substrate on which the high-frequency circuit and the DC source are present for decoupling a wide frequency range. Capacitors of low capacitance are thus used for decoupling higher frequencies and capacitors of high capacitance for decoupling the lower frequencies.

The use and mounting of several discrete decoupling capacitors is not only expensive, but the discrete decoupling capacitors also occupy much space on the substrate.

A decoupling capacitor is known from U.S. Pat. No. 6,038,122, of which one electrode has a tapering shape, for example a triangular or fan shape. This special electrode design gives the capacitor varying capacitance values between its two connection terminals, and the different frequencies are decoupled in different regions of the decoupling capacitor. It is an advantage of this decoupling capacitor that only one discrete component is to be mounted. A disadvantage of this decoupling capacitor is that it is very complicated and expensive in manufacture because of the special electrode structure.

SUMMARY OF THE INVENTION

The invention has for its object to provide a mobile telephone device fitted with a transmitter and a receiver, which may each comprise a high-frequency component with a decoupling capacitor, wherein the decoupling capacitor effects a decoupling over a wide frequency range and is simple to manufacture.

This object is achieved by means of a mobile telephone device provided with a transmitter and a receiver, which may each comprise a high-frequency integrated circuit component, wherein the high-frequency component comprises a high-frequency circuit, a DC source, and a decoupling capacitor all integrated together on a common substrate, wherein the decoupling capacitor comprises a first electrode, a dielectric, a second electrode, and a first and a second current supply terminal on one and the same side of the decoupling capacitor, and wherein one electrode is connected to the high-frequency circuit and the DC source and the other electrode is connected to ground.

It is possible to create a decoupling capacitor of low inductance value in the mobile telephone device through the direct integration of the decoupling capacitor on the substrate with the high-frequency circuit, because very small electrode dimensions are possible. As a result, the C/L ratio of the decoupling capacitor can be increased. In addition, a decoupling capacitor can be manufactured in which the current supply terminals lie on the same side of the decoupling capacitor, owing to the integration. A contacting of the electrodes on the same side of the capacitor means that the current flows in opposite directions through the electrodes, and the magnetic fields occurring in the decoupling capacitor and defining the self-induction are clearly reduced. The C/L ratio of the decoupling capacitor is increased thereby. The provision of the current supply terminals on one side is also referred to as the counter-current principle.

The improved C/L ratio of the decoupling capacitor means that only one decoupling capacitor is required for decoupling a wide frequency band.

A further advantage of the mobile telephone device is that the external dimensions of an integrated decoupling capacitor are smaller, so that smaller high-frequency components can be manufactured. In total this renders possible a further miniaturization of the mobile telephone device. Furthermore, an expensive mounting of discrete decoupling capacitors on the high-frequency component becomes redundant.

The invention further relates to a high-frequency component which comprises a high-frequency circuit, a DC source, and an integrated decoupling capacitor on a common substrate, wherein the decoupling capacitor comprises a first electrode, a dielectric, a second electrode, and a first and a second current supply terminal on one and the same side of the decoupling capacitor, and wherein one electrode is connected to the high-frequency circuit and the DC source and the other electrode is connected to ground.

Preferably, the decoupling capacitor is constructed by means of thin-film technology.

The C/L ratio of a decoupling capacitor can be influenced by means of thin film processes. In a thin-film process, a decoupling capacitor can be realized whose dielectric has a smaller layer thickness d (d<1 $\mu$m), and which accordingly has a higher capacitance density. The resulting decoupling capacitor has a higher value for its C/L ratio.

It is particularly preferred that a further integrated passive component is provided on the substrate.

Further integrated passive components such as, for example, a coil, a resistor, or a capacitor may be provided directly on the substrate through a suitable structuring of the electrodes and the dielectric of the decoupling capacitor or through the deposition of further functional layers. As a result, the mounting of further discrete components which are to be present on the high-frequency component is avoided, and a further miniaturization of the mobile telephone device is rendered possible.

It is advantageous when the high-frequency circuit is an amplifier circuit, a mixer stage, or a voltage-controlled oscillator.

An effective decoupling of undesirable high-frequency signals is necessary in all these high-frequency circuits.

BRIEF DESCRIPTION OF THE DRAWING

The invention will now be explained in more detail below with reference to three Figures and two embodiments. In the drawing.

DESCRIPTION OF THE PREFERRED EMBODIMENTS

A mobile telephone device comprises, for example, power supply means, a display device, a loudspeaker, a microphone, an input device, a memory device, an antenna, a transmitter, and a receiver. The transmitter and the receiver may each comprise a high-frequency component with a high-frequency circuit 8 and a DC source 9. The high-frequency component comprises a decoupling capacitor for decoupling the DC source 9 from the high-frequency signals.

Figure 1:
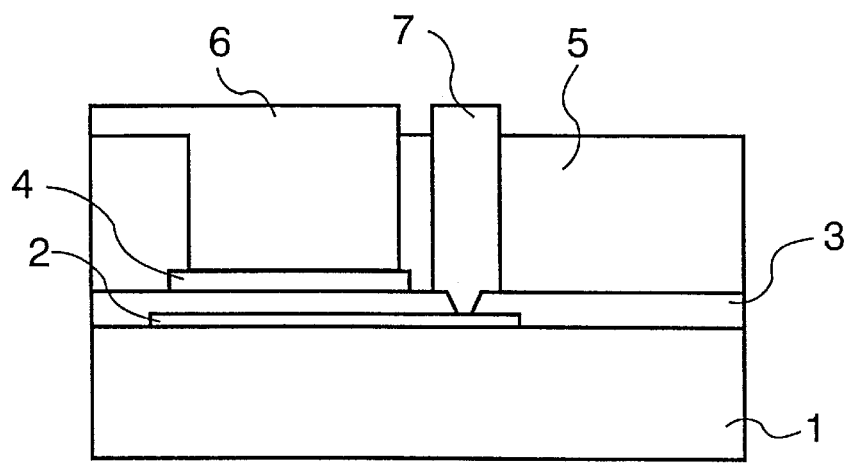
FIG. 1 is a cross-sectional view of a substrate with an integrated decoupling capacitor.

In FIG. 1, an integrated decoupling capacitor comprises a first electrode 2 on a substrate 1 which comprises, for example, a ceramic material, a low-temperature cofired substrate with functions, a ceramic material with a planarizing layer of glass, a glass-ceramic material, a glass material, Si, GaAs, sapphire, a laminate, a glass substrate with an adhesive layer, or a glass substrate with an adhesive layer and an $SiO_2$ layer on the adhesive layer. If silicon or GaAs is used as the substrate 1, an additional passivating layer of, for example, $SiO_2$, $Si_3N_4$, or glass is provided on the substrate 1. A dielectric 3, preferably having a dielectric constant $\epsilon_r$ with a value $\epsilon_r > 20$, is present on the first electrode 2. Materials which may be used are, for example, $PbZr_xTi_{1-x}O_3$ ($0 \leq x \leq 1$) with and without dopants of La or Mn and with or without excess lead, $Ba_{1-x}Sr_xTiO_3$) $0 \leq x \leq 1$) with and without dopants, $[Ba_{1-x}Sr_xTiO_3]\text{-}Pb_{1-y}Ca_yTiO_3$ ($0 \leq x \leq 1$, $0 \leq y \leq 1$), $Ba_{1-x}Sr_xZr_yTi_{1-y}O_3$ ($0 \leq x \leq 1$, $0 \leq y \leq 1$) with and without dopants, $Ba_{1-x}Pb_xTiO_3$ ($0 \leq x \leq 1$) with and without excess lead, $Ba_{1-x}Ca_xTiO_3$ ($0 \leq x \leq 1$), $SrZr_xTi_{1-x}O_3$ ($0 \leq x \leq 1$) with and without dopants, $[PbMg_{1/3}Nb_{2/3}O_3]_x\text{-}[PbTiO_3]_{1-x}$ ($0 \leq x \leq 1$), $(Pb,Ba,Sr)(Mg_{1/3}Nb_{2/3})_xTi_y(Zn_{1/3}Nb_{2/3})_{1-x-y}O_3$ ($0 \leq x \leq 1$, $0 \leq y \leq 1$), $Pb_{1-x}Ca_xTiO_3$ ($0 \leq x \leq 1$), $(Ba_{1-x}Sr_x)_2NaNb_5O_{15}$ ($0 \leq x \leq 1$), $(Ba_{1-x}Sr_x)_2KNb_5O_{15}$ $0 \leq x \leq 1$), $(Ba_{1-x}Sr_x)_2K_{1-3y}SE_yNb_5O_{15}$ ($0 \leq x \leq 1$, $0 \leq y \leq 1$ SE=ion from the group of rare earth metals, $Ta_2O_5$, $Ta_2O_5$ doped with $Al_2O_3$, $TiO_2$, $Ta_2O_5$ doped with $TiO_2$ and $Zr(Sn,Ti)O_4$, $BiNO_4$ with and without $VO_x$ ($1 \leq x \leq 2.5$) and/or CuO dopants and a) $PbMg_{1/2}W_{1/2}O_3$
b) $PbFe_{1/2}Nb_{1/2}O_3$
c) $PbFe_{2/3}W_{1/3}O_3$
d) $PbNi_{1/3}Nb_{2/3}O_3$
e) $PbZn_{1/3}Nb_{2/3}O_3$
f) $PbSc_{1/2}Ta_{1/2}O_3$ as well as combinations of the compounds a) to f) with $PbTiO_3$ and/or $PbMg_{1/3}Nb_{2/3}O_3$. The dielectric 3 may alternatively be provided over the entire surface of the substrate 1. A second electrode 4 is provided on the dielectric 3. The first electrode 2 and the second electrode 4 may comprise, for example, Pt with a layer thickness of 50 nm to 1 $\mu$m, Ti with a layer thickness of 1 to 20 nm/Pt with a layer thickness of 20 to 600 nm, Ti with a layer thickness of 1 to 20 nm/Pt with a layer thickness of 20 to 600 nm/Ti with a layer thickness of 1 to 20 nm, W, Ni, Mo, Au, Cu, Ti/Pt/Al, Ti/Ag, Ti/Ag/Ti, Ti/Ag/Ir, Ti/Ir, Ti/Pd, $Ti/Ag_{1-x}Pt_x$ ($0 \leq x \leq 1$), $Ti/Ag_{1-x}Pd_x$ ($0 \leq x \leq 1$), $Ag_{1-x}Pt_x$ ($0 \leq x \leq 1$), $Ti/Pt_{1-x}Al_x$ ($0 \leq x \leq 1$), $Pt_{1-x}Al_x$ ($0 \leq x \leq 1$), $Ti/Ag/Pt/_{1-x}Al_x$ ($0 \leq x \leq 1$), Ti/Ag/Ru, Ru, $Ru/RuO_2$, Ti/Ru, Ti/Ir, $Ti/Ir/IrO_2Ti/Ru/Ru_xPt_{1-x}$ ($0 \leq x \leq 1$), $Ti/Ag/Ir/IrO_x$ ($0 \leq x \leq 2$), $Ti/Ag/Ru/RuO_x$ ($0 \leq x \leq 2$), $Ti/Ag/Ru/Ru_xPt_{1-x}$ ($0 \leq x \leq 1$), $Ti/Ag/Ru/Ru_xPt_{1-x}/RuO_y$ ($0 \leq x \leq 1$, $0 \leq y \leq 2$), $Ti/Ag/Ru/RuO_x/Ru_y/Pt_{1-y}$ ($0 \leq x \leq 2$, $0 \leq y \leq 1$), $Ti/Ag/Ru_xPt_{1-x}$ ($0 \leq x \leq 1$), $Ti/Ag/Pt_xAl_{1-x}$ ($0 \leq x \leq 1$), $Pt_xAl_{1-x}/Ag/Pt_yAl_{1-y}$ ($0 \leq x \leq 1$, $0 \leq y \leq 1$), $Ti/Ag/Pt_y$ $(RhO_x)_{1-y}$ ($0 \leq x \leq 2$, $0 \leq y \leq 1$), $Ti/Ag/Rh/RhO_x$ ($0 \leq x \leq 2$), Rh, $Rh/RhO_2$, $Ti/Ag/Pt_xRh_{1-x}$ ($0 \leq x \leq 1$), $Ti/Ag/Pt_y(RhO_x)_{1-y}/Pt_zRh_{1-z}$ ($0 \leq x \leq 2$, $0 \leq y \leq 1$, $0 \leq z \leq 1$), $Ti/Ag_xPt_{1-x}/Ir$ ($0 \leq x \leq 1$), $Ti/Ag_xPt_{1-x}/Ir/IrO_y$ ($0 \leq x \leq 1$, $0 \leq y \leq 2$), $Ti/Ag_xPt_{1-x}/Pt_yAl_{1-y}$ ($0 \leq x \leq 1$, $0 \leq y \leq 1$), $Ti/Ag_xPt_{1-x}/Ru$ ($0 \leq x \leq 1$), $Ti/Ag_xPt_{1-x}/Ru/RuO_y$ ($0 \leq x \leq 1$, $0 \leq y \leq 2$), Ti/Ag/Cr, Ti/Ag/Ti/ITO, Ti/Ag/Cr/ITO, Ti/Ag/ITO, Ti/Ni/ITO, Ti/Rh, $Ti/Rh/RhO_2$, Ti/Ni/Al/ITO, Ti/Ni, Ti/W/Ti, $W_xTi_{1-x}$ ($0 \leq x \leq 1$), $W_xTi_{1-x}/Al(Cu)$ ($0 \leq x \leq 1$), $W_xTi_{1-x}/Al(Si)$ ($0 \leq x \leq 1$), $W_xTi_{1-x}/Al$ ($0 \leq x \leq 1$), Al, Al doped with Cu, Al doped with Si, $Ni_xCr_yAl_zAl$ ($0 \leq x \leq 1$, $0 \leq y \leq 1$, $0 \leq z \leq 1$), $Ni_xCr_yAl_z/Al$ doped with Cu ($0 \leq x \leq 1$, $0 \leq y \leq 1$, $0 \leq z \leq 1$), $Ni_xCr_yAl_z/Al$ doped with Si ($0 \leq x \leq 1$, $0 \leq y \leq 1$, $0 \leq z \leq 1$) or Ti/Cu. A protective layer 5, preferably extending over the entire surface of the substrate 1, lies on the second electrode 2. Materials which may be used for the protective layer 5 are, for example, $SiO_2$ or $Si_3N_4$. The second electrode 4 is contacted by means of a first current supply terminal 6 and the second electrode by means of a second current supply terminal 7. The first and the second current supply terminal 6, 7 may comprise, for example, Al, Cu, Cu/Ni/Au, Ni/Cr/Cu/Ni/Au, or Ni/Au.

The further components of the high-frequency component are then provided on the protective layer 5.

The first current supply terminal 6 connects the decoupling capacitor to the high-frequency circuit 8 and to the DC source 9, and the second current supply terminal 7 is connected to ground 12.

Alternatively, a barrier layer may be provided between the substrate 1 and the first electrode 2, which layer comprises, for example, $TiO_2$, $Al_2O_3$, $HfO_2$, MgO, or $ZrO_2$.

Figure 2:
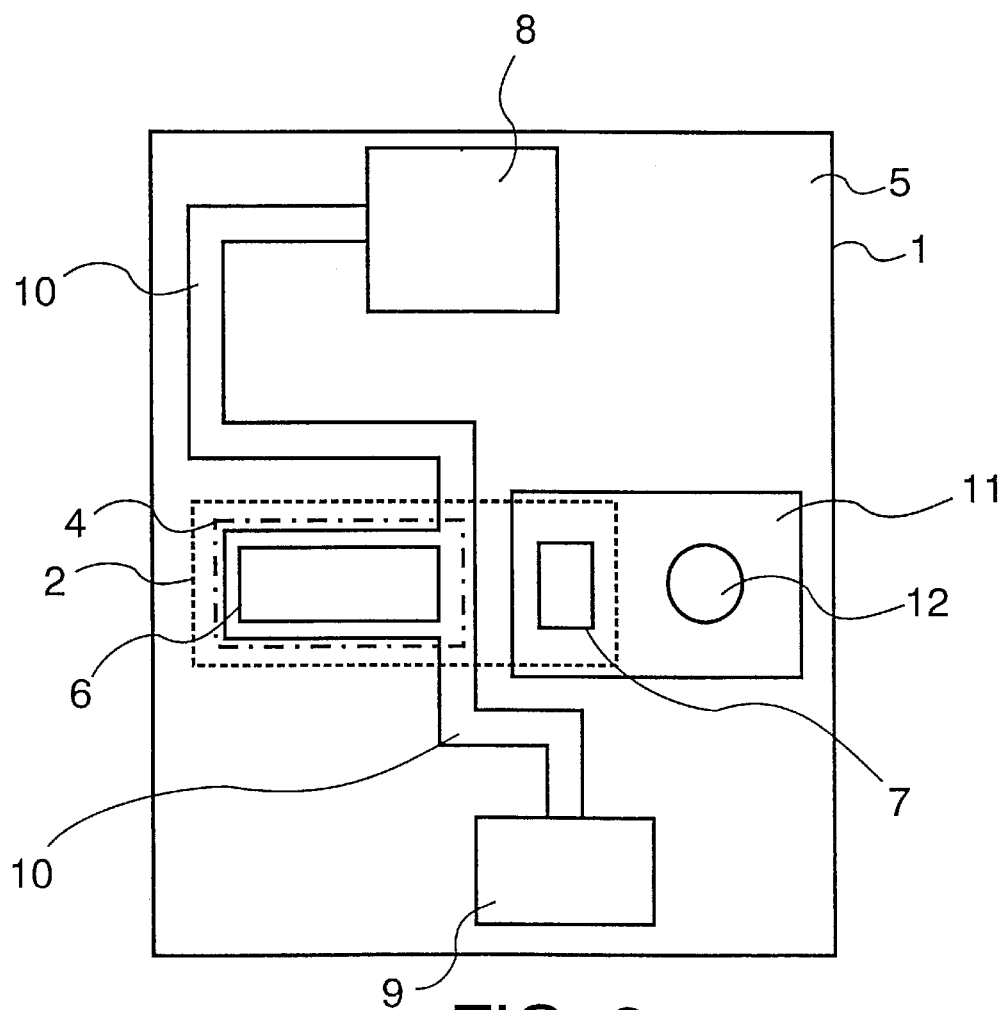
FIG. 2 is a plan view of a substrate with a decoupling capacitor, a high-frequency circuit, and a DC source.

FIG. 2 is a plan view of a substrate 1 with the electrodes 2, 4 and current supply terminals 6, 7 of the decoupling capacitor, a high-frequency circuit 8, a DC source 9, and conductor tracks 10, 11. On the substrate 1 lies the first electrode 2 of the decoupling capacitor, and thereon the dielectric 3 which is not shown in FIG. 2. The second electrode 4 lies on the dielectric 3. The protective layer 5 is provided on the second electrode 4 and over the entire surface of the substrate 1. The high-frequency circuit 8, the DC source 9, and the conductor tracks 10, 11 are provided on the protective layer. The high-frequency circuit 8 is, for example, an amplifier circuit, a mixer stage, or a voltage-controlled oscillator. The high-frequency circuit 8 is connected to the decoupling capacitor and to the DC source 9, which is, for example, a battery, via the conductor track 10 which is made, for example, of Al, Cu, Cu/Ni/Au, Ni/Cr/Cu/Ni/Au, or Ni/Au. The second current supply terminal 7 and the conductor track 11, for example, made of Al, Cu, Cu/Ni/Au, Ni/Cr/Cu/Ni/Au, or Ni/Au, connect the decoupling capacitor to ground 12. The first current supply terminal 6 and the second current supply terminal 7 are provided on the same side of the decoupling capacitor.

The high-frequency circuit 8 may alternatively be mounted by means of wire bonding or flip-chip mounting.

Alternatively, a further integrated passive electric component such as, for example, a resistor, a coil, or a further capacitor may be provided on the substrate 1. For this purpose, further functional layers such as, for example, a resistance layer or a first electrode, a dielectric, and a second electrode of a further capacitor lie on the protective layer 5. A further protective layer will be provided on the uppermost functional layer. The integrated passive electric component is electrically contacted through vias in the further protective layer. This passive component may be connected to further components present on the high-frequency component, for example, a transistor circuit.

It is also possible for two or more integrated passive components such as, for example, a resistor and a capacitor, for example with a lower capacitance value C than the decoupling capacitor, to be provided on the substrate 1. For this purpose, a resistance layer and a first electrode of the further capacitor are provided on the protective layer 5. A first further protective layer lies thereon, at the same time forming the dielectric of the further capacitor. The second electrode of the further capacitor is provided on this first further protective layer, and a second further protective layer is provided on the second electrode, preferably extending over the entire surface of the substrate 1. The integrated passive components are electrically contacted through vias in the further protective layers and are connected to further components present on the high-frequency component, for example a transistor circuit, by means of conductor tracks.

The functional layers such as, for example, the electrodes 2, 4 and the dielectric 3 are first provided on the substrate 1 by means of known thin-film techniques and structured in accordance with their functions in the manufacture of the high-frequency component. After the protective layer 5 has been deposited, the items necessary for the high-frequency component such as, for example, the high-frequency circuit 8, the conductor tracks 10, 11, and the DC source 9, are provided by known methods.

Such a high-frequency component may be used, for example, in the transmitter or receiver of a mobile communication system, for example a mobile telephone device, or in a mobile data transmission system, for example a Bluetooth module.

Figure 3:
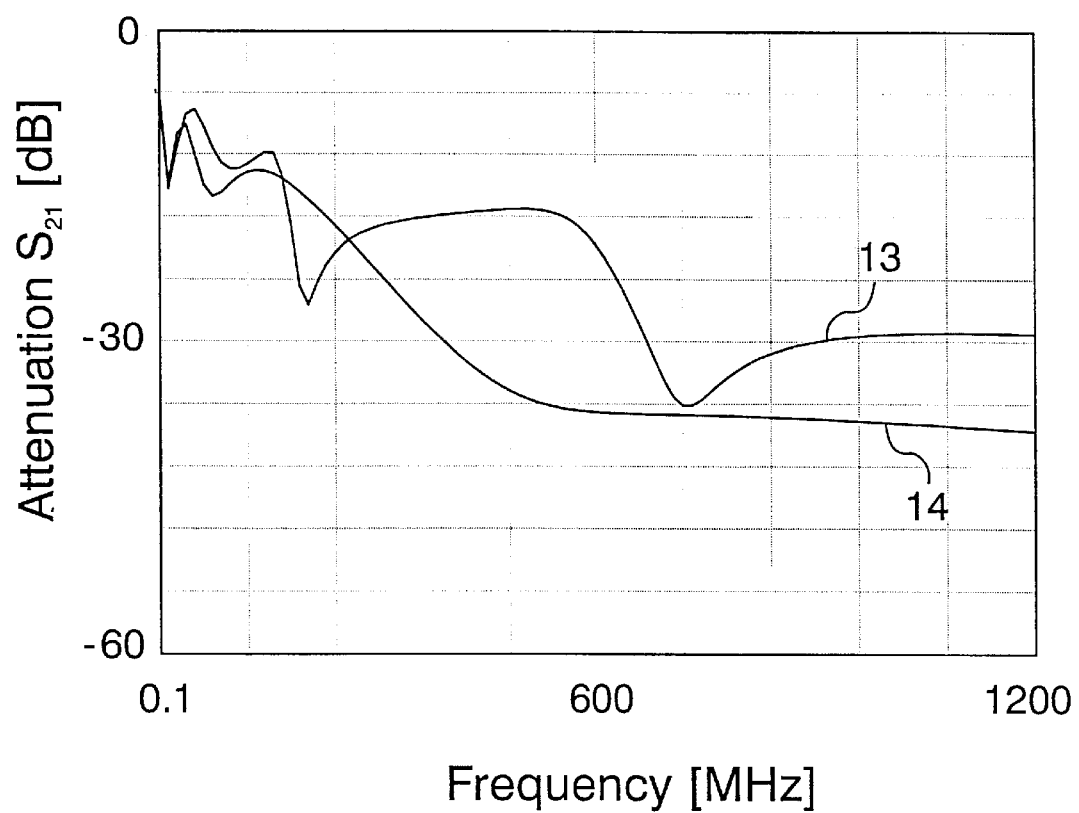
FIG. 3 shows the attenuation curve of two discrete capacitors in comparison with the attenuation curve of an integrated decoupling capacitor.

FIG. 3 shows the attenuation curve of two discrete capacitors in comparison with the attenuation curve of an integrated decoupling capacitor. Curve 13 represents the attenuation curve of two discrete capacitors, the first discrete capacitor having a capacitance of 330 pF and an inductance of 0.6 nH. The second discrete capacitor has a capacitance of 82 pF and an inductance of 0.6 nH. Curve 14 represents the attenuation curve of an integrated decoupling capacitor with a capacitance of 1 nF and an inductance of 0.1 nH.

Alternatives in the construction of the high-frequency component, for example as to which electrode 2, 4 of the decoupling capacitor is connected to ground, are familiar to those skilled in the art.

Embodiments of the invention will be explained in more detail below, representing examples of how the invention may be carried into practice.

Embodiment 1

A first electrode 2 of Ti/Pt is provided on a substrate 1 of $Al_2O_3$ with a glass planarizing layer. A dielectric 3 of $PbZr_{0.53}Ti_{0.47}O_3$ with 5% lanthanum doping is deposited on the first electrode 2 and over the entire surface of the substrate 1. A second electrode 4 of $Ti_{0.1}W_{0.9}/Al$ is provided on the dielectric 3. A protective layer 5 of $Si_3N_4$ is present on the second electrode 4 and over the entire surface of the substrate 1. A hole was etched through the protective layer 5 and filled with Ni/Cr/Cu/Ni/Au for contacting the second electrode 4 with a first current supply terminal 6. A hole was etched through the protective layer 5 and the dielectric 3 and filled with Ni/Cr/Cu/Ni/Au for contacting the first electrode 2 with a second current supply terminal 7. An amplifier circuit is provided as the high-frequency circuit 8 on the protective layer 5 along with conductor tracks 10, 11 of Ni/Cr/Cu/Ni/Au. A battery is provided as the DC source 9. The conductor track 10 is structured such that it connects the high-frequency circuit 8, the first current supply terminal 6, and the DC source 9 to one another. The conductor track 11 is structured such that it connects the second current supply terminal 7 to ground 12.

Such a high-frequency component was incorporated in the transmitter and receiver of a mobile telephone device.

Embodiment 2

A barrier layer of $TiO_2$ is provided on a glass substrate 1, and a first electrode 2 of Ti/Pt is provided on said barrier layer. A dielectric 3 of $PbZr_{0.53}Ti_{0.47}O_3$ with 5% lanthanum doping is deposited on the first electrode 2 and over the entire surface of the substrate 1. A second electrode 4 of $Ti_{0.1}W_{0.9}/Al$ is provided on the dielectric 3. A protective layer 5 of $Si_3N_4$ lies on the second electrode 4 and over the entire surface of the substrate 1. A resistance layer of $Ni_{0.3}Cr_{0.6}Al_{0.1}$ and a further protective layer of $Si_3N_4$ are provided on the protective layer 5. A hole is etched through the protective layer 5 and the further protective layer and is filled with Ni/Cr/Cu/Ni/Au for contacting the second electrode 4 with a first current supply terminal 6. A hole is etched through the protective layer 5, the further protective layer, and the dielectric 3 and is filled with Ni/Cr/Cu/Ni/Au for contacting the first electrode 2 with a second current supply terminal 7. Two holes are etched into the further protective layer and are filled with Ni/Cr/Cu/Ni/Au for contacting the resistance layer. An amplifier circuit is provided on the further protective layer as the high-frequency circuit 8, and a battery, conductor tracks 10, 11 of Ni/Cr/Cu/Ni/Au, and a transistor circuit are provided as the DC source 9. The conductor track 10 is structured such that it interconnects the high-frequency circuit 8, the first current supply terminal 6, and the DC source 9. The conductor track 11 is structured such that it connects the second current supply terminal 7 to ground. The resistor is connected to the transistor circuit by means of a conductor track.

Such a high-frequency component was incorporated in a mobile Bluetooth module.

What is claimed is:

1. A mobile telephone device comprising: a transmitter and a receiver, each of which comprise a high-frequency integrated circuit component, wherein the high-frequency integrated circuit component comprises; a high-frequency circuit, a DC source, and a decoupling capacitor all integrated together on a common substrate, wherein the decoupling capacitor comprises a first electrode, a dielectric, a second electrode, and a first and a second current supply terminal on one and the same side of the decoupling capacitor, and wherein one electrode is connected to the high-frequency circuit and the DC source and the other electrode is connected to ground.

2. A mobile telephone device as claimed in claim 1, characterized in that the high-frequency circuit is an amplifier circuit, a mixer stage, or a voltage-controlled oscillator.

3. The mobile telephone device as claimed in claim 1 wherein the decoupling capacitor is constructed by means of thin-film technology.

4. A high-frequency component which comprises: a high-frequency circuit, a DC source, and an integrated decoupling capacitor on a common substrate, wherein the decoupling capacitor comprises a first electrode, a dielectric, a second electrode, and a first and a second current supply terminal on one and the same side of the decoupling capacitor, and wherein one electrode is connected to the high-frequency circuit and the DC source and the other electrode is connected to ground.

5. A high-frequency component as claimed in claim 4, characterized in that the decoupling capacitor is constructed by means of thin-film technology.

6. A high-frequency component as claimed in claim 4, characterized in that a further integrated passive electric component forms on the substrate an integrated circuit together with the high frequency circuit, the DC source and the decoupling capacitor.

7. A high-frequency component as claimed in claim 4 wherein
the first and second current supply terminals, the high-frequency circuit, the DC source and first and second conductor tracks all lie in a plane overlying the substrate, and
the first conductor track interconnects the high-frequency circuit, the first current supply terminal and the DC source and the second conductor track connects the second current supply terminal to ground.

8. A high-frequency component as claimed in claim 4 further comprising:
a protective layer over the second electrode and over the entire surface of the common substrate and with a hole therein having a conductive material for electrically contacting the second electrode to the first current supply terminal,
a resistance layer and a further protective layer provided over the protective layer, and wherein
the first and second current supply terminals, the high-frequency circuit and the DC source all lie in a plane overlying the further protective layer.

9. A high-frequency component as claimed in claim 8 further comprising:
first and second conductor tracks in said plane overlying the further protective layer, and wherein
a first conductive hole is present through the protective layer and the further protective layer for electrically contacting the second electrode to the first current supply terminal,
a second conductive hole is present through the protective layer, the further protective layer and the dielectric for electrically contacting the first electrode to the second current supply terminal.

10. A high-frequency component as claimed in claim 9 further comprising:
two further conductive holes in the further protective layer for making electrical contact to the resistance layer.

11. A high-frequency component as claimed in claim 4 wherein the first and second current supply terminals, the high frequency circuit and the DC source all lie in a common plane overlying the substrate.

12. A high-frequency component as claimed in claim 11 further comprising a conductor track in said common plane and interconnecting the high-frequency circuit, the first current supply terminal and the DC source.

13. The high frequency component as claimed in claimed 11 wherein the dielectric is sandwiched between the first and second electrodes on one surface of the common substrate, and further comprising a conductor track in said common plain and interconnecting the high frequency circuit, the first current supply terminal and the DC source.

14. The high frequency component as claimed in claim 4, wherein the decoupling capacitor, together with the common substrate, forms an integrated circuit device.

15. A high-frequency component, which comprises: a high-frequency circuit, a DC source, and an integrated decoupling capacitor on a common substrate, wherein the decoupling capacitor comprises a first electrode, a dielectric, a second electrode, and a first and a second current supply terminal on one and the same side of the decoupling capacitor, and wherein one electrode is connected to the high-frequency circuit and the DC source and the other electrode is connected to ground, and the dielectric is sandwiched between the first and second electrodes on one surface of the common substrate, and further comprising a conductor track overlying the substrate and interconnecting the high-frequency circuit, the first current supply terminal and the DC source.

16. A high-frequency component, which comprises: a high frequency circuit, a DC source, and an integrated decoupling capacitor on a common substrate, wherein the decoupling capacitor comprises a first electrode, a dielectric, a second electrode, and a first and a second current supply terminal on one and the same side of the decoupling capacitor, and wherein one electrode is connected to the high-frequency circuit and the DC source and the other electrode is connected to ground, and the dielectric is sandwiched between the first and second electrodes on one surface of the common substrate, and further comprising;
a protective layer over the second electrode and over the entire surface of the common substrate and with a hole therein having a conductive material for electrically contacting the second electrode to the first current supply terminal, and wherein
the first current supply terminal, the high-frequency circuit and the DC source lie in a plane overlying the protective layer.

17. A high-frequency component as claimed in claim 16 wherein
a further hole is present in the protective layer and in the dielectric with the further hole having a conductive material for electrically connecting the first electrode to the second supply terminal.

18. A high-frequency component as claimed in claim 17 wherein
the first and second current supply terminals, the high-frequency circuit, the DC source and first and second conductor tracks all lie in a plane overlying the protective layer, and
the first conductor track interconnects the high-frequency circuit, the first current supply terminal and the DC source and the second conductor track connects the second current supply terminal to ground.

19. A high-frequency component, and which comprises: a high-frequency circuit, a DC source, and an integrated decoupling capacitor on a common substrate, wherein the decoupling capacitor comprises a first electrode, a dielectric, a second electrode, and a first and a second current supply terminal on one and the same side of the decoupling capacitor, and wherein one electrode is connected to the high-frequency circuit and the DC source and the other electrode is connected to ground, wherein the first and second current supply terminals are positioned relative to one another so as to produce, in the vicinity of the integrated decoupling capacitor, opposed magnetic fields that effectively reduce the inherent inductance of the decoupling capacitor in a manner so as to increase the CPU ratio thereof.

20. A high-frequency component, which comprises: a high-frequency circuit, a DC source, and an integrated decoupling capacitor on a common substrate, wherein the decoupling capacitor comprises a first electrode, a dielectric, a second electrode, and a first and a second current supply terminal on one and the same side of the decoupling capacitor, and wherein one electrode is connected to the high-frequency circuit and the DC source and the other electrode is connected to ground, and further comprising:
a protective layer over the second electrode and over the entire surface of the common substrate,
first and second conductor tracks, and wherein
the first and second current supply terminals, the high-frequency circuit, the DC source and the first and second conductor tracks all lie in a plane overlying the protective layer, and
the first conductor track interconnects the high-frequency circuit, the first current supply terminal and the DC source and the second conductor track connects the second current supply terminal to ground.

21. A mobile telephone device, comprising: a transmitter and a receiver, each of which comprise a high-frequency component, wherein the high-frequency component comprises; a high-frequency circuit, a DC source, and an integrated decoupling capacitor on a common substrate, wherein the decoupling capacitor comprises a first electrode, a dielectric, a second electrode, and a first and a second current supply terminal on one and the same side of the decoupling capacitor, and wherein one electrode is connected to the high-frequency circuit and the DC source and the other electrode is connected to ground, and the dielectric is sandwiched between the first and second electrodes on one surface of the common substrate, and further comprising
a conductor track overlying the substrate and interconnecting the high-frequency circuit, the first current supply terminal and the DC source.

22. The mobile telephone device as claimed in claim 21 further comprising:
a protective layer over the second electrode and over the entire surface of the common substrate, and wherein
the first and second current supply terminals, the high-frequency circuit, the DC source and the conductor track all lie in a plane overlying the protective layer.

23. The mobile telephone device as claimed in claim 22 further comprising a second conductor track which also lies in said plane overlying the protective layer and the second conductor track connects the second current supply terminal to ground.

\* \* \* \* \*